United States Patent
Swaine et al.

(10) Patent No.: US 12,164,425 B2
(45) Date of Patent: Dec. 10, 2024

(54) TECHNIQUE FOR TRACKING MODIFICATION OF CONTENT OF REGIONS OF MEMORY

(71) Applicant: Arm Limited, Cambridge (GB)

(72) Inventors: Andrew Brookfield Swaine, Sheffield (GB); Olof Henrik Uhrenholt, Lomma (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/258,849

(22) PCT Filed: Dec. 8, 2021

(86) PCT No.: PCT/GB2021/053213
§ 371 (c)(1),
(2) Date: Jun. 22, 2023

(87) PCT Pub. No.: WO2022/148943
PCT Pub. Date: Jul. 14, 2022

(65) Prior Publication Data
US 2024/0045802 A1    Feb. 8, 2024

(30) Foreign Application Priority Data
Jan. 6, 2021 (GB) ..................... 2100128

(51) Int. Cl.
*G06F 3/06*   (2006.01)
*G06F 12/0811*   (2016.01)
(Continued)

(52) U.S. Cl.
CPC ...... *G06F 12/0811* (2013.01); *G06F 12/0848* (2013.01); *G06F 12/1009* (2013.01)

(58) Field of Classification Search
CPC ............. G06F 12/0811; G06F 12/0848; G06F 12/1009; G06F 12/08; G06F 2212/1016; G06F 2212/1028; G06F 2212/651
See application file for complete search history.

(56) References Cited

U.S. PATENT DOCUMENTS

2012/0278525 A1*  11/2012  Serebrin ............. G06F 12/1027
                                                            711/6
2019/0121744 A1   4/2019   Bonzini et al.
2019/0188150 A1*  6/2019   Woo ..................... G06F 12/0868

FOREIGN PATENT DOCUMENTS

JP           5965486 B2    8/2016

OTHER PUBLICATIONS

International Search Report for International Application No. GB2100128.4, dated Sep. 29, 2021.
(Continued)

*Primary Examiner* — Khoa D Doan
*Assistant Examiner* — Tong B. Vo
(74) *Attorney, Agent, or Firm* — NIXON & VANDERHYE P.C.

(57) ABSTRACT

Address translation circuitry (20) converts virtual addresses into physical addresses with reference to intermediate level and final level page tables. Final level descriptors within final level page tables identify address translation data for an associated region of memory. Intermediate level descriptors within intermediate level page tables identify intermediate address translation data used to identify an associated page table at a next level of the page tables. Page table update circuitry (35) maintains state information within each final and intermediate level descriptor, and updates the state information from a clean state to a dirty state: in the final level descriptors to indicate that a modification of content of the associated memory region is permitted; in the intermediate level descriptors to indicate occurrence of an update (Continued)

from the clean state to the dirty state within the state information of any final level descriptors that are accessed via that intermediate level descriptor.

20 Claims, 12 Drawing Sheets

(51) Int. Cl.
  *G06F 12/0846* (2016.01)
  *G06F 12/1009* (2016.01)

(56) References Cited

OTHER PUBLICATIONS

International Search Report and Written Opinion for International Application No. PCT/GB2021/053213, dated Jan. 27, 2022.

* cited by examiner

TECHNIQUE FOR TRACKING MODIFICATION OF CONTENT OF REGIONS OF MEMORY

BACKGROUND

A technique for tracking modification of content of regions of memory is described herein.

There are many situations where it can be useful when performing data processing operations to determine whether any modifications have been made to areas of memory. For instance, a processing circuit may be required to perform a processing operation on the data stored within a range of memory addresses, and a significant reduction in processing requirements may occur if it can be determined that the data has not been altered since the last time the processing operation was performed on the data values in that memory address range.

By way of specific example, a graphics processing unit (GPU) may be required to perform a graphics rendering operation in respect of a block of data identified by a memory address range. Such a process can be used to produce one or more image frames for storing in associated frame buffers. Often a frame is divided into tiles, and the rendering operation is performed on the individual tiles. Once a tile has been rendered, then it may be possible to determine whether the rendered tile differs from the corresponding tile rendered in a previous rendering cycle, and if so some bandwidth savings can be achieved by avoiding the need to write that newly rendered tile into the relevant frame buffer.

However, such an approach still requires the input data to be rendered in each rendering cycle, and it would be highly desirable to be able to detect, prior to rendering, whether any of the input data has changed since the previous rendering cycle. In particular, if such a determination could be made, it would be possible in some situations to avoid performing rendering at all, hence giving rise to significant performance benefits and/or energy consumption savings.

SUMMARY

In one example arrangement, there is provided an apparatus comprising: address translation circuitry for converting a virtual address specified by processing circuitry into a corresponding physical address of a memory system, with reference to address translation data obtained from a hierarchical arrangement of page tables, the hierarchical arrangement of page tables comprising both intermediate level page tables and final level page tables; each final level page table comprising a number of final level descriptors, and each final level descriptor identifying the address translation data for an associated region of memory; each intermediate level page table comprising a number of intermediate level descriptors, and each intermediate level descriptor identifying intermediate address translation data used to identify an associated page table at a next level in the hierarchical arrangement; page table update circuitry to maintain state information within each final level descriptor, the page table update circuitry being arranged to update the state information of a given final level descriptor from a clean state to a dirty state to indicate that a modification of content of the associated region of memory is permitted; wherein the page table update circuitry is further arranged to maintain the state information within the intermediate level descriptors provided within at least a subset of the intermediate level page tables, such that for a given intermediate level descriptor in which the state information is maintained, the page table update circuitry is arranged to update the state information of that given intermediate level descriptor from the clean state to the dirty state to indicate occurrence of an update from the clean state to the dirty state within the state information of any final level descriptors that are accessed via that intermediate level descriptor.

In another example arrangement, there is provided a method of tracking modification of content of regions of memory, comprising: employing address translation circuitry to converting a virtual address specified by processing circuitry into a corresponding physical address of a memory system, with reference to address translation data obtained from a hierarchical arrangement of page tables, the hierarchical arrangement of page tables comprising both intermediate level page tables and final level page tables; arranging each final level page table to comprise a number of final level descriptors, each final level descriptor identifying the address translation data for an associated region of memory; arranging each intermediate level page table to comprise a number of intermediate level descriptors, each intermediate level descriptor identifying intermediate address translation data used to identify an associated page table at a next level in the hierarchical arrangement; employing page table update circuitry to maintain state information within each final level descriptor, the page table update circuitry being arranged to update the state information of a given final level descriptor from a clean state to a dirty state to indicate that a modification of content of the associated region of memory is permitted; arranging the page table update circuitry to additionally maintain the state information within the intermediate level descriptors provided within at least a subset of the intermediate level page tables, such that for a given intermediate level descriptor in which the state information is maintained, the page table update circuitry is arranged to update the state information of that given intermediate level descriptor from the clean state to the dirty state to indicate occurrence of an update from the clean state to the dirty state within the state information of any final level descriptors that are accessed via that intermediate level descriptor.

In a still further example arrangement, there is provided an apparatus comprising: address translation means for converting a virtual address specified by processing circuitry into a corresponding physical address of a memory system, with reference to address translation data obtained from a hierarchical arrangement of page tables, the hierarchical arrangement of page tables comprising both intermediate level page tables and final level page tables; each final level page table comprising a number of final level descriptors, and each final level descriptor identifying the address translation data for an associated region of memory; each intermediate level page table comprising a number of intermediate level descriptors, and each intermediate level descriptor identifying intermediate address translation data used to identify an associated page table at a next level in the hierarchical arrangement; page table update means for maintaining state information within each final level descriptor, the page table update means for updating the state information of a given final level descriptor from a clean state to a dirty state to indicate that a modification of content of the associated region of memory is permitted; the page table update means for additionally maintaining the state information within the intermediate level descriptors provided within at least a subset of the intermediate level page tables, such that for a given intermediate level descriptor in which the state information is maintained, the page table update means is arranged to update the state information of that given intermediate level descriptor from the clean state to the dirty state to indicate occurrence of an update from the clean state to the dirty state within the state information of any final level descriptors that are accessed via that intermediate level descriptor.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
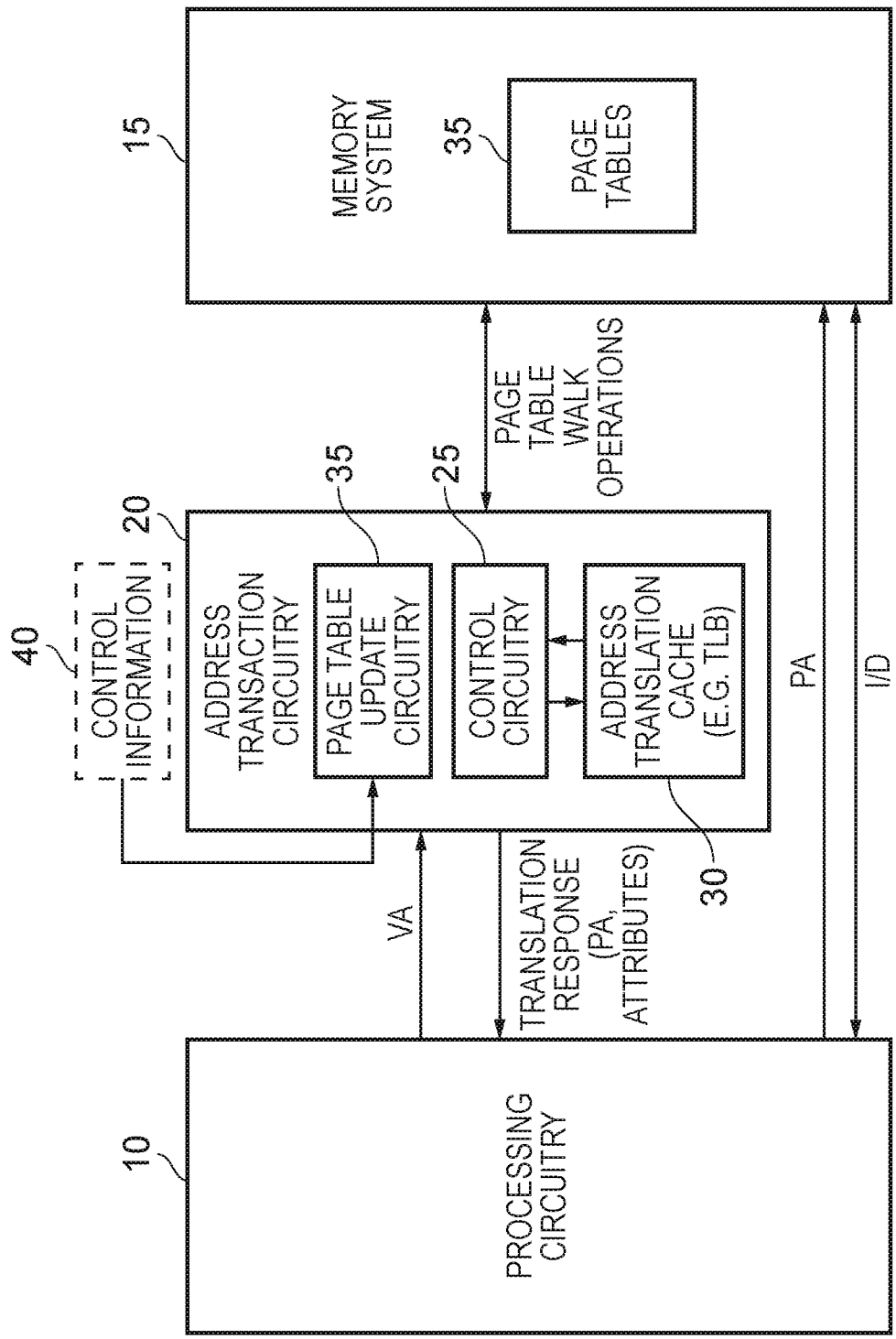
FIG. 1 illustrates a data processing system in accordance with one example arrangement.

In accordance with one example implementation an apparatus is provided that has address translation circuitry for converting a virtual address specified by processing circuitry into a corresponding physical address of a memory system. The address translation circuitry performs this conversion with reference to address translation data that is obtained from a hierarchical arrangement of page tables, the hierarchical arrangement of page tables comprising both intermediate level page tables and final level page tables.

Each final level page table comprises a number of final level descriptors, and each final level descriptor identifies the address translation data for an associated region of memory. The associated region of memory can be defined in a variety of ways, but in one example implementation each region of memory may comprise a page of memory.

Each intermediate level page table comprises a number of intermediate level descriptors, and each intermediate level descriptor identifies intermediate address translation data used to identify an associated page table at a next level in the hierarchical arrangement.

Using a supplied virtual address, the address translation circuitry can hence be arranged to traverse through the multiple different levels of the hierarchical arrangement of page tables, starting with a page table at a lowest hierarchical level, often referred to as level L0, and continuing until a final level page table is identified, with a portion of the virtual address being used to identify a particular final level descriptor within that final level page table, as a result of which a particular region of memory will then be identified.

In accordance with the techniques described herein page table update circuitry is arranged to maintain state information within each final level descriptor. This state information can take a variety of forms, but in accordance with the techniques described herein provides information as to whether there has been any modification of content within the associated region of memory identified by a final level descriptor. The page table update circuitry is arranged to update the state information of a given final level descriptor from a clean state to a dirty state to indicate that a modification of content of the associated region of memory is permitted. The update of the state information to the dirty state may for example be performed when a write is allowed to be performed within the associated region of memory, and the exact timing of the update from the clean state to the dirty state may vary dependent on implementation. For example, the update to the dirty state may occur before the write is performed, or may occur in result to the write being performed.

The clean state can take a variety of forms, but in one example implementation, when the state information indicates the clean state, this indicates that the associated region of memory is currently read only, but that it can be changed to allow writing to that associated region of memory upon a request from the processing circuitry. Hence, once such a request is received, this can be used to trigger the transition of the state information from the clean state to the dirty state.

Returning to the earlier discussed issue of how to determine when a modification has been made to content within a block of memory, for example a block of memory that may be referenced by a GPU when seeking to render an image frame, in principle it would be possible to employ the address translation circuitry to traverse the hierarchical arrangement of page tables in order to identify each final level descriptor that is associated with a region of memory within that overall address range of interest. However, traversing the hierarchical arrangement of page tables in its entirety to reach a final level descriptor is time consuming, and it may well be the case that there are a significant number of final level descriptors that would need to be accessed in order to cover the full address range of interest, and determine whether any of those final level descriptors has state information indicating the dirty state.

However, in accordance with the techniques described herein, the page table update circuitry is further arranged to maintain the state information within the intermediate level descriptors provided within at least a subset of the intermediate level page tables. In particular, for a given intermediate level descriptor in which the state information is maintained, the page table update circuitry may be arranged to update the state information of that given intermediate level descriptor from the clean state to the dirty state to indicate occurrence of an update from the clean state to the dirty state within the state information of any final level descriptors that are accessed via that intermediate level descriptor.

It will be appreciated that a final level descriptor may be accessed via an intermediate level descriptor in situations when that intermediate level descriptor is at the penultimate level in the hierarchical arrangement, and hence identifies the final level page table including that final level descriptor. However, a final level descriptor can also be viewed as being accessed via an intermediate level descriptor when that intermediate level descriptor is at another lower level in the hierarchy separated from the final level by one or more intervening levels. Purely by way of example, if a given intermediate level descriptor within a given lower level page table identifies a higher level intermediate page table, and that higher level intermediate page table provides an intermediate level descriptor that then identifies a final level page table containing a given final level descriptor, it is still the case that that given final level descriptor is accessed via the given intermediate level descriptor, albeit through one or more intervening levels of the hierarchical arrangement of page tables.

By propagating this state information back through one or more intermediate level descriptors, this significantly increases the speed with which such state information can be referenced in order to determine whether any data within a specified memory address range has been modified. Considering the earlier GPU example where, during a current rendering cycle, the GPU is seeking to read input data required to render one or more image frames, a relatively large address range (comprising multiple pages in memory) may need to be considered. However, by propagating state information back through a certain number of the intermediate level descriptors, it may be possible to identify a relatively small number of intermediate level descriptors that need reviewing, and in particular if the state information for any of those identified intermediate level descriptors does not indicate the clean state, it may be determined that rendering is required. Conversely however, if all of the relevant intermediate level descriptors covering the specified address range indicate the clean state, it is known that no updates have been performed within a specified memory address range, and in such instances it may be possible to avoid performing the rendering operation.

Hence, it has been found that by propagating the state information back through one or more intermediate level descriptors, this can provide an efficient mechanism for checking whether the content in relatively large ranges of addresses has been altered, and hence makes reference to such state information a practical proposition in various example scenarios when seeking to detect whether content within a range of memory addresses has been altered or not.

In one example implementation, the hierarchical arrangement of page tables comprises a plurality of levels of page tables, and the at least a subset of the intermediate level page tables within which the page table update circuitry is arranged to maintain the state information comprises the intermediate level page tables at at least one level of the hierarchical arrangement. Hence, in such an implementation the page table update circuitry can be arranged to maintain the state information at certain intermediate levels within the hierarchy, but not necessarily at all such levels. In some instances for example, it may be considered not appropriate to maintain the state information at the lowest level (i.e. the LO level), since it may be the case that if an attempt were made to maintain state information at that level the state information would transition to the dirty state quite quickly and hence not provide useful information. Hence, the levels at which the state information is maintained can be tuned to particular implementations. For example, in some implementations it may be decided to only maintain the state information at a single intermediate level, whereas in other implementations it may be decided to maintain the state information at multiple intermediate levels, but not necessarily all intermediate levels. When the state information is maintained at multiple intermediate levels, then those multiple intermediate levels may be adjacent levels within the hierarchical arrangement, but alternatively non-adjacent levels may be chosen.

There are a number of different ways in which the page table update circuitry may determine when to transition state information within an intermediate level descriptor from the clean state to the dirty state, in particular as regards the timing relative to when the relevant final level descriptor is updated from the clean state to the dirty state. In accordance with a first example implementation, which may be referred to as a top down approach, the page table update circuitry may be arranged to maintain the state information within the intermediate level descriptors such that identification of the dirty state within the state information of the given intermediate level descriptor indicates that a modification of content of the associated page table at the next level in the hierarchical arrangement is permitted. As a result, the page table update circuitry is arranged to update the state information of the given final level descriptor from the clean state to the dirty state to indicate that a modification of content of the associated region of memory is permitted, once each intermediate level descriptor used to identify that given final level descriptor, that has state information maintained therein, identifies the dirty state within that state information. Hence, in accordance with such an approach, it will be understood that the setting of the dirty state within a given intermediate level descriptor is a prerequisite for allowing a transition from the clean to the dirty state in any descriptors at a higher level in the hierarchy, this including the relevant final level descriptor and any intervening level descriptors between the given intermediate level descriptor and that final level descriptor.

However, in accordance with an alternative implementation, which may be referred to as a bottom up approach, the page table update circuitry may be arranged, in response to updating the state information of the given final level descriptor from the clean state to the dirty state to indicate that a modification of content of the associated region of memory is permitted, to track back through the levels in the hierarchical arrangement to identify each intermediate level descriptor used to identify that final level descriptor, and for each identified intermediate level descriptor that has state information maintained therein, to update the state information as necessary to indicate the dirty state. At one or more intermediate levels it will be appreciated that an update will not be needed if the relevant intermediate level descriptor already indicates the dirty state.

In one example implementation the apparatus may further comprise address translation cache storage to store copies of one or more descriptors retrieved from the hierarchical arrangement of page tables. This can improve performance when seeking to perform address translation operations, in situations where the relevant descriptors are already cached within the address translation cache storage, hence avoiding the need to perform a page table walk process in memory in order to identify the required descriptors. In such an implementation, the page table update circuitry may be arranged to reference the address translation cache storage when determining which page table descriptors need updating when seeking to update content within the region of memory associated with the given final level descriptor.

In one example implementation, when the address translation cache storage stores a copy of the given final level descriptor whose state information indicates the dirty state, the page table update circuitry is arranged to determine that no update is required to the page table descriptors in the hierarchical arrangement of page tables. In particular the updates to the state information in the relevant intermediate level descriptors are performed at a time a final level descriptor is transitioned from the clean state to the dirty state, and hence no update will be required when a final level descriptor already in the dirty state is encountered.

However, in the absence of the address translation cache storage storing a copy of the given final level descriptor whose state information indicates the dirty state, the page table update circuitry may be arranged to determine that an analysis operation is required in respect of the intermediate level descriptors used to identify the given final level descriptor, in order to determine whether state information maintained for any of those intermediate level descriptors is required to be updated in addition to updating the state information of the given final level descriptor from the clean state to the dirty state.

It will be appreciated that there are a variety of situations that will result in the absence of the address translation cache storage storing a copy of the given final level descriptor whose state information indicates the dirty state. For example, it may be that no cached copy of the given final level descriptor is stored within the address translation cache storage. However, in addition, it could be the case that there is a cached copy of the given final level descriptor, but that its state information indicates the clean state. When considering the page table update process performed by the page table update circuitry, the presence within the address translation cache storage of the required given final level descriptor, but with its state information indicated as clean, is effectively treated as a miss within the address translation cache storage, and hence triggers the above-mentioned analysis operation.

To perform the analysis operation, it may be necessary to perform a page table walk process in order to access the required intermediate level descriptors within memory. However, in some instances it may be possible to perform at least part of the analysis operation using information maintained within the address translation cache storage.

In one example implementation, the address translation cache storage comprises a translation lookaside buffer to store copies of one or more final level descriptors. In some implementations, only final level descriptors may be cached, but in an alternative implementation the address translation cache storage may further comprise an intermediate descriptor cache (also referred to as a walk cache) to store copies of intermediate level descriptors from page tables at one or more intermediate levels in the hierarchical arrangement of page tables. When the address translation cache storage does include an intermediate descriptor cache, then at least part of the above-mentioned analysis operation may be performed with reference to the contents of the address translation cache storage.

In particular, in one example implementation, in the absence of the translation lookaside buffer storing a copy of the given final level descriptor whose state information indicates the dirty state, the page table update circuitry is arranged to perform a lookup operation in the intermediate descriptor cache to seek to track back through the levels in the hierarchical arrangement until either a copy of a non-clean state intermediate level descriptor used to identify the given final level descriptor is detected, or the lookup operation has been performed for all levels in the hierarchical arrangement for which intermediate level descriptors are cached in the intermediate descriptor cache, a non-clean state intermediate level descriptor being an intermediate level descriptor whose state information indicates a non-clean state.

The non-clean state can take a variety of forms, but in one example is either the earlier mentioned dirty state, or a non-tracked state. A non-tracked state can arise for example when a page in memory is always marked as both readable and writeable, and hence the status information does not identify whether a modification has actually been made. In particular, it cannot be deduced based on an untracked state whether the associated memory page has been modified or not, since any modification would not result in a change to the status information.

By seeking to determine with reference to the intermediate descriptor cache whether that intermediate descriptor cache stores a relevant intermediate level descriptor in the non-clean state, this can be used to reduce the number of levels that need to be considered when determining which intermediate level descriptors need their state information updating. In particular, when during the lookup operation a copy of a non-clean state intermediate level descriptor used to identify the given final level descriptor is detected, the page table update circuitry is then arranged to identify any intermediate level descriptors used to identify the given final level descriptor that exist in levels between the level containing the non-clean state intermediate level descriptor and the final level containing the given final level descriptor, and to then identify the dirty state within the state information maintained by any of those identified intermediate level descriptors.

Once the address translation cache contents have been used in the above way to seek to identify which intermediate level descriptors need updating in addition to the final level descriptor, then typically any cached copies of descriptors whose state information is being updated will be updated or invalidated to ensure that the address translation circuitry does not make reference to out of date descriptor information in any future reference to the contents of the address translation cache. Further, known coherency/synchronisation techniques can also be used to ensure cached copies of the relevant descriptors maintained elsewhere in the system are either updated or invalidated when the page table update circuitry updates status information of those descriptors. In accordance with one example scheme the local cached copy of each updated descriptor (i.e. the copy in the address translation cache referenced by the page table update circuitry) is updated. In addition, each updated descriptor is written to memory, and any other cached copies of each updated descriptor held elsewhere in the system are invalidated so that the next time that descriptor is needed the updated version will be read from memory. The coherency protocol is arranged to implement a strict ordering between steps to ensure that the updated descriptor is used in all instances.

As mentioned earlier, by maintaining the status information within intermediate level descriptors, this can be of use in influencing operations performed by any processing circuitry that may have access to those descriptors. In one example implementation, the processing circuitry is arranged to cause the state information maintained within one or more of the intermediate level descriptors to be referenced when determining data processing operations to be performed by the processing circuitry.

By way of particular example, the processing circuitry may be arranged to periodically perform a graphics rendering operation in respect of a block of data identified by a memory address range. In such an implementation, the processing circuitry may be arranged, at least when a current rendering cycle meets determined criteria, to issue a request to the address translation circuitry that causes the address translation circuitry to identify a set of regions of memory covered by the memory address range, to determine one or more intermediate level descriptors used to identify the final level descriptors for that set of regions of memory, and to reference the state information stored in those determined one or more intermediate level descriptors in order to determine whether any update to the block of data has occurred since a previous rendering cycle. In the event it is determined that no update of the block of data has occurred since the previous rendering cycle, the processing circuitry is arranged to use an output of the graphics rendering operation in the previous rendering cycle instead of re-performing the graphics rendering operation.

Such an approach can give rise to significant performance and energy consumption benefits. In particular, it will be appreciated that significant performance and energy consumption benefits can be realised when it is possible to avoid performing the graphics rendering operation. This also has knock on additional benefits, for example by avoiding the need to read input data that would otherwise be required for the current graphics rendering cycle.

As noted above, in some implementations the request to the address translation circuitry may only be issued by the processing circuitry if a current rendering cycle meets certain determined criteria. For example, whilst the input data to be processed may be considered "indirect state", in that it is not directly known by the processing circuitry and has to be retrieved from memory before rendering can take place, other inputs for a current rendering cycle will be known to the processing circuitry and those inputs may be referred to as "direct state". Such direct state may for example be specified by the input command that is triggering the rendering operation, and/or be provided in registers or command buffers before rendering starts. The split between direct state and indirect state may vary dependent on GPU architecture, but by way of example such direct state may be information describing how many render targets there are, how many samples per pixel, pointers to resource tables which contain pointers to buffers, etc. In one example implementation, this direct state needs to match the direct state in the previous rendering cycle before the current rendering cycle is a candidate for the skipping of the rendering operation, and hence meeting the determined criteria referred to above would involve determining that this direct state matched that of the previous rendering cycle.

The state information as discussed above may also include additional items of state. For example, the state information within each final level descriptor may further comprise an access flag that is set to indicate that the associated region of memory has been accessed, and the state information maintained within the given intermediate level descriptor may further include an access flag which is set whenever any final level descriptors that are accessed via that intermediate level descriptor have set their access flag to indicate access to the associated region of memory. In some instances it may be useful to propagate such access flag information back through the intermediate level descriptors.

Exactly which levels of the hierarchical arrangement of page tables are used in order to maintain the state information may be fixed or may be configurable. In one example implementation the apparatus further comprises storage to maintain control information referenced by the page table update circuitry to determine in which levels of the hierarchical arrangement to maintain the status information. This hence allows configurability of the mechanism.

Particular examples will now be described with reference to the figures.

FIG. 1 schematically illustrates a data processing system including processing circuitry (which may for example be a central processing unit (CPU) or a graphics processing unit (GPU)) for executing program instructions and for performing data accesses (both instruction fetches and accesses to data to be manipulated) using virtual addresses VA. These virtual addresses are subject to address translation to physical addresses PA by address translation circuitry 20. The physical addresses are used to control access to instructions and data in a memory system 15. The memory system 15 may comprise a memory hierarchy, such as multiple levels of cache memory and a main memory or other non-volatile storage.

As shown in FIG. 1, the address translation circuitry 20 includes an address translation cache 30, which in one example may include at least a translation lookaside buffer (TLB). The address translation cache 30 has a plurality of entries, where each entry stores address translation data used when converting a virtual address into a corresponding physical address of a memory system. The address translation data is determined by performing page table walk operations in respect of page tables 35 stored within the memory system 15. As will be discussed later with reference to FIG. 3, a multi-level page table walk process may be used in order to obtain, with reference to a final level descriptor, full address translation data enabling a virtual address to be converted into a physical address, and that full address translation data may be stored within the address translation cache 30. Taking the example where the address translation cache is a TLB, a TLB is usually used to store such full address translation data. However, as will be discussed in more detail later, the address translation cache may in one example implementation include a further cache structure to store partial address translation data (also referred to herein as intermediate address translation data) obtained with reference to one or more intermediate level descriptors.

As shown schematically in FIG. 1, when the processing circuitry 10 issues a virtual address to the address translation circuitry 20, the control circuitry 25 can perform a lookup operation within the address translation cache 30 to determine whether a hit is detected within one of the entries of the address translation cache. In one embodiment, the address translation cache has a set associative structure, and certain bits of the virtual address may be used as an index into the address translation cache in order to identify a set, with the entries within that set being reviewed in order to determine whether a hit is detected. If a hit is detected, then a translation response can be returned directly to the processor core 10, this including physical address bits and associated attributes stored within the hit entry within the address translation cache. Based on this information, the core can then generate a physical address to output to the memory system 15 in order to access a required instruction, or data to be manipulated. If a hit is not detected within the address translation cache, the address translation circuitry 20 will initiate a page table walk process in order to access the relevant page tables 35 within the memory system in order to walk through a sequence of descriptors until a final level descriptor is obtained, at which point full address translation data can be determined and an appropriate translation response can then be returned to the core. During this process, one or more entries within the address translation cache 30 can be allocated to store address translation data derived from the accessed descriptors. This is likely to enable a subsequently issued virtual address to result in a hit within the address translation cache, thereby reducing access times.

Figure 2:
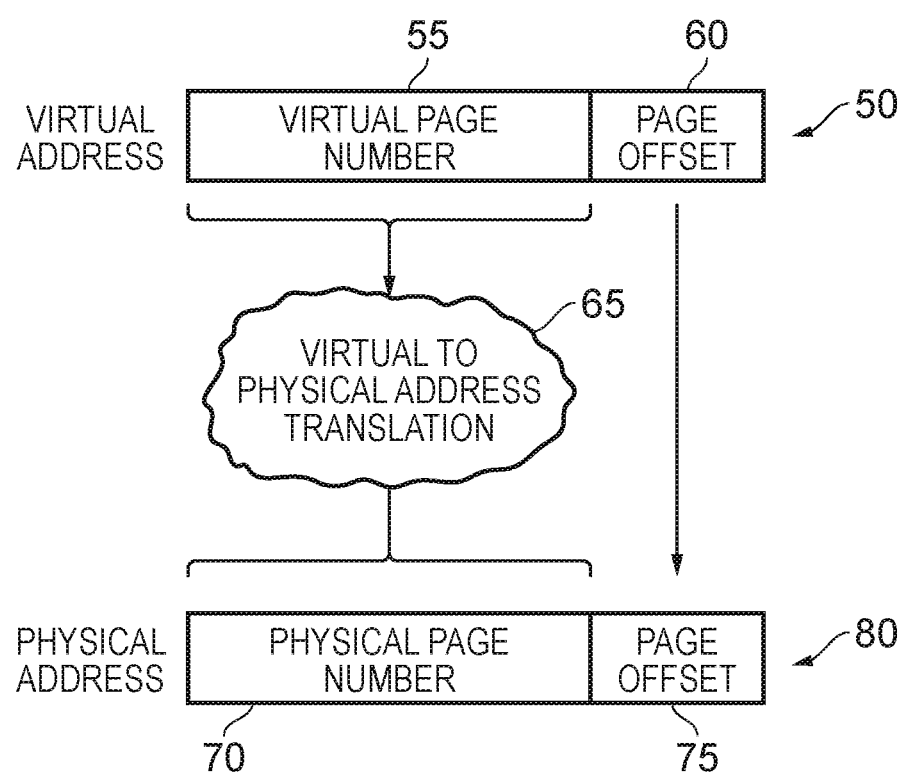
FIG. 2 is a diagram schematically illustrating a virtual to physical address translation process.

FIG. 2 is a diagram schematically illustrating the address translation process. A virtual address 50 can be considered to comprise a number of bits 55 identifying a virtual page number, and some other bits 60 identifying a page offset. The number of bits forming the virtual page number and the number of bits forming the page offset will depend on the page size. The address translation operation performed by the address translation circuitry 20 is illustrated schematically by the element 65 shown in FIG. 2, and serves to obtain address translation information sufficient to enable the virtual page number bits 55 to be translated into equivalent bits 70 of a physical address 80 identifying a physical page number. The page offset bits are not altered, and accordingly the page offset bits 75 are directly determined from the page offset bit in the virtual address.

Figure 3:
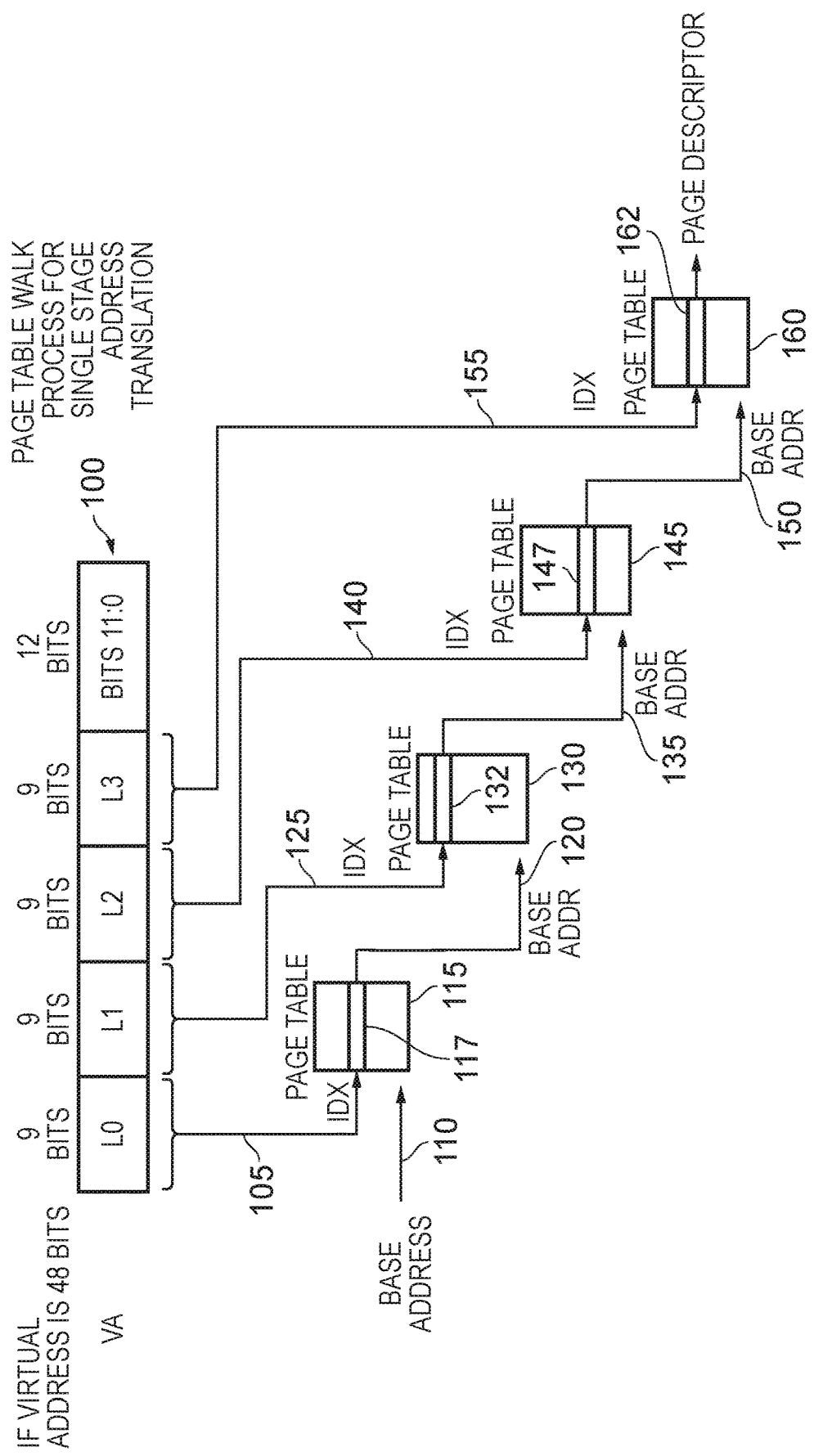
FIG. 3 schematically illustrates a multi-level page table walk which includes a single stage address translation process.

FIG. 3 is a diagram schematically illustrating the page table walk operation assuming there is a single stage address translation mechanism being used. In this example, it is assumed that the virtual address is 48 bits, and hence the virtual address 100 has a series of 9 bit portions associated with different levels of the page table walk process, with the 12 least significant bits denoting page offset.

At the start of the page table walk process, a base register is accessed to identify a base address 110 that is used to identify the page table 115. The 9 bits 105 associated with level zero of the page table walk process are used to identify an index into that page table 115, and hence identify an intermediate level descriptor 117. This intermediate level descriptor 117 provides a base address 120 that is used to identify a further page table 130, with the level one virtual address bits 125 being used to identify an index into that table. This identifies the intermediate level descriptor 132 that provides a further base address 135 to identify the page table 145. The level 2 virtual address bits 140 are then used to provide an index into that table 145 in order to identify the intermediate level descriptor 147, which then provides the base address 150 that identifies a final page table 160. The level 3 virtual address bits 155 then provide an index into that table 160, identifying a final level descriptor 162 also referred to as a page descriptor or leaf descriptor. With the information provided by the page descriptor, it is then possible to generate address translation data for storing in one of the entries of the TLB 30 enabling the virtual page number 55 to be converted into a physical page number 70 and hence allowing the required page in memory to be identified. This then enables the particular item of data (or instruction) corresponding to the virtual address to be accessed by the core 10 issuing the required physical address to the memory system 15.

It should be noted that in some implementations final level descriptors can be specified at an earlier level in the page table walk process. For example, the descriptor 147 can have a block field which, when set, indicates that that descriptor is a block descriptor, which is a type of final level descriptor, rather than being an intermediate level descriptor.

Hence, in such a situation the information within the descriptor 147 can be used to produce the full address translation data.

From the above description it will be seen that the page tables are organised in a hierarchical arrangement, with the intermediate level descriptors in a level 0 page table being used to identify page tables at level 1, the intermediate level descriptors in a level 1 page table being used to identify page tables at level 2, and so on, until at the penultimate level the intermediate level descriptors in a page table at that level are used to identify page tables at a final level. The final level descriptors in such a final level page table then identify associated memory regions, e.g. pages in memory.

Figures 4A, 4B:
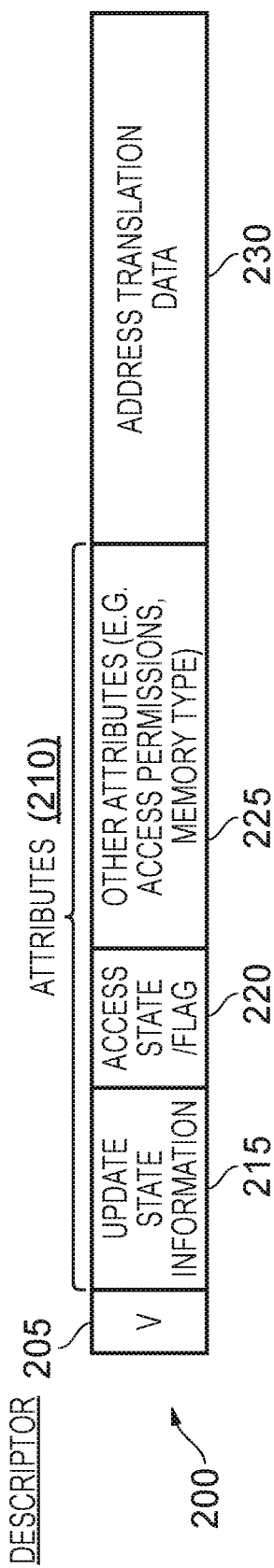
FIG. 4A schematically illustrates information that may be provided within a descriptor in accordance with one example implementation.
FIG. 4B illustrates in more detail the update state information that may be provided within such a descriptor.

FIG. 4A illustrates information that may be provided within a descriptor. In particular, the descriptor 200 may include a valid field 205 to identify whether the descriptor contents are valid or not, various attributes fields 210 and an address translation data field 230. For a final level descriptor, the address translation data 230 will identify an associated region in memory, for example an associated page in memory. For an intermediate level descriptor, the address translation data will instead be intermediate address translation data that can be used to identify an associated page table at a next level in the hierarchy of page tables.

Within a final level descriptor the attributes 210 in one example implementation include update state information 215, an access state indication or flag 220, and one or more other attributes 225, for example access permissions, memory type attributes, etc. The attributes 225 may in one example implementation only be provided in final level descriptors, or only a subset of them may be replicated in intermediate level descriptors. In addition, in accordance with the techniques described herein page table update circuitry 35 (see FIG. 1) is provided that is able to maintain at least the update state information, and also if desired the access state indication, within the intermediate level descriptors provided within at least a subset of the intermediate page tables, for example within those page tables at one or more intermediate levels within the hierarchical arrangement of page tables. In particular, the page table update circuitry is arranged to ensure that when certain changes are made within that state information in a final level descriptor, that change is also reflected in any intermediate level descriptors that are arranged to maintain that state information, and that are used when accessing the final level descriptor.

Hence, purely by way of example, if the page table update circuitry determined that it was appropriate to update certain state information within the final level descriptor 162, then if either or both of the intermediate level descriptors 147, 132 were also arranged to maintain that state information, the page table update circuitry would determine whether any update was necessary to the corresponding state held in those intermediate level descriptors. This process can in principle be replicated all the way up to a level 0 intermediate level descriptor such as the intermediate level descriptor 117, but in some implementations it may be considered to be inappropriate to seek to replicate such state information at such a low level within the hierarchy.

FIG. 4B indicates the form of the update state information 215 used in one particular example implementation. As shown, the update state information 215 contains a two bit field, the first bit being referred to as a Dirty Bit Modify (DBM) bit and the second bit being referred to as a permission bit. When the DBM bit is at a logic 0 value, and the permission bit is at a logic 0 value, this means that the associated memory region pointed to by a final level descriptor containing that update state information is read only. Conversely, if the permission bit is set (i.e. a logic 1 value in this example implementation) and the DBM bit is clear (i.e. a logic 0 value in this example implementation), this means that the associated region of memory is both readable and writeable, but no tracking is performed as to whether a write has actually been performed.

Considering now situations where the DBM bit is set, then when the permission bit is 0 this means that the associated memory region is read only, and is considered to be in a clean state. In particular, when the update state information has this form, it means that the contents of the associated memory region have not been written to. However, in contrast to the "00" read only state of the update state information, the clean state indicates a state where the associated memory region is allowed to be transitioned into a read write state upon a suitable request to transition to that state, for example by a request issued by processing circuitry that is seeking to write to that memory region. In this event, the DBM bit remains set, but the permission bit transitions from the clear state to the set state, thereby indicating that the memory page is now in the dirty state, where it is both readable and writeable. The transition from the clean state to the dirty state hence indicates that modification of the contents of the associated region of memory is now permitted, and it is assumed that when the associated memory region is in the dirty state its contents have been modified.

The above description is made with reference to the meaning of the update state information when provided in association with a final level descriptor. As mentioned earlier, in accordance with the techniques described herein the page table update circuitry that is used to manage that update state information within the final level descriptors is also able to maintain corresponding state information within the intermediate level descriptors provided within at least one of the intermediate levels of the page table hierarchy. Of particular interest is the clean and dirty state, and in particular the page table update circuitry is arranged to update the state information in a given intermediate level descriptor from the clean state to the dirty state to indicate occurrence of an update from the clean state to the dirty state within the state information of any final level descriptors that are accessed via that intermediate level descriptor.

Hence, considering by way of example the intermediate level descriptor 147 that is used to point to the page table 160, and hence is used when accessing any of the final level descriptors within that page table 160, if any of the final level descriptors in the page table 160 have their state information changed from the clean state to the dirty state, then the corresponding update state information within the page table 147 will be updated to indicate the dirty state.

This process can be replicated throughout any desired levels within the hierarchical arrangement. Hence, considering the intermediate level descriptor 132, this is used to identify the page table 145, and hence if any of the intermediate level descriptors within the page table 145 have their state information updated from the clean state to the dirty state, then the intermediate level descriptor 132 will also have its update state information changed from the clean state to the dirty state, assuming it is not yet in the dirty state.

Considering the access state flag 220 that may be maintained in association with a final level descriptor, this access state flag can be set to indicate that the associated region of memory has been accessed. If desired, this state information can also be maintained within the intermediate level descriptors at one or more intermediate levels, and in an analogous manner to that described earlier with reference to the update state information, an access flag within a given intermediate level descriptor may be set whenever any final level descriptors that are accessed via that intermediate level descriptor have set their access flag to indicate access to the associated region of memory. In some instances, it can be useful to maintain the access state information within intermediate level descriptors in addition to the update state information, but in other implementations only the update state information may be replicated within the intermediate level descriptors. The following discussion will describe in more detail how the update state information is maintained within the intermediate level descriptors, but it will be appreciated that analogous techniques can also be used to manage maintaining of the access state information within such intermediate level descriptors.

Returning to FIG. 1, the address translation circuitry 20 includes the earlier-mentioned page table update circuitry 35 that is used to perform updates to page table contents, including updates to the update state information, and optionally access state information, maintained in the final level descriptors and within the intermediate level descriptors of any levels where such information is replicated. In one example implementation, the intermediate levels at which the update state information is replicated may be fixed, but in other examples this may be configurable, for example with reference to control information 40 stored within the system, identifying at which intermediate levels the page table update circuitry is to maintain update state information.

Whilst for the purposes of the description herein it is assumed that the page table update circuitry 35 is a component provided within the address translation circuitry 20, in alternative implementations it may be possible to provide the page table update circuitry as a separate component to the address translation circuitry. However, it can be more efficient to provide the page table update circuitry 35 within the address translation circuitry 20, since typically the page table update circuitry will be activated in response to a write operation to a page, and the address translation circuitry 20 will receive a request from the processing circuitry 10 relating to that write operation that can be used to trigger the activities of the page table update circuitry 35.

Figure 5:
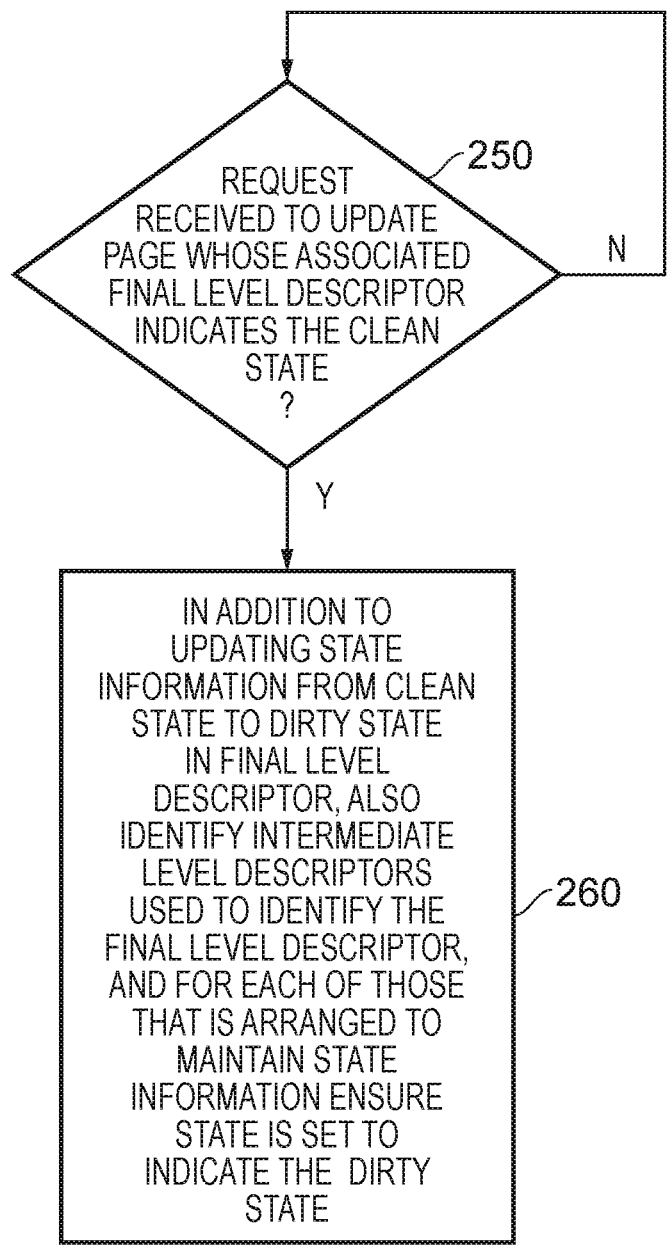
FIG. 5 is a flow diagram illustrating a process performed in accordance with the techniques described herein, when a request is received to update a page in memory whose associated final level descriptor indicates the clean state.

FIG. 5 is a flow diagram illustrating the state information update process performed in accordance with the techniques described herein. At step 250, it is detected whether a request has been received from the processing circuitry that is seeking to update a page whose associated final level descriptor indicates the clean state. Such a request may be issued for example due to software executing on the processing circuitry, and at the time the request is initially received from the processing circuitry 10 by the address translation circuitry 20 it will not typically be known what update state value is stored in the relevant final level descriptor. Accordingly, a lookup within the address translation cache 30, followed by any page table walk process required in order to obtain the final level descriptor for the relevant page being accessed, may be performed. Once the final level descriptor has been accessed, then the update state information can be checked in order to determine whether the final level descriptor indicates the clean state.

It should also be noted that other checks may also be performed at this stage in order to check that the write request that has been received is permitted to proceed in relation to the identified memory page, and hence for example to check that the processing circuitry in its current execution mode is allowed to access the identified memory address. However, for the purposes of the following discussion it is assumed that all such additional checks have been passed, and at step 250 it is determined whether the final level descriptor for the relevant page indicates the clean state.

In situations where the final level descriptor does indicate the clean state, then the process proceeds to step 260. Prior to the present technique, such update state information would typically only reside within final level descriptors, and the page table update circuitry would be arranged to change the state from the clean state to the dirty state in that final level descriptor. However, as indicated by step 260, in addition to any such update to the final level descriptor, the page table update circuitry is also arranged to identify the intermediate level descriptors that are used to identify that final level descriptor, and for each of those intermediate level descriptors that is arranged to maintain state information, the page table update circuitry ensures that that state information is set to indicate the dirty state. This may for some intermediate level descriptors involve transitioning the state from the clean state to the dirty state, but it will be appreciated that for some intermediate level descriptors no update may be needed, since they may already indicate the dirty state, due to a different final level descriptor that is also accessed using that intermediate level descriptor having previously transitioned from the clean state to the dirty state.

There are a number of ways in which step 260 of FIG. 5 may be implemented, and in particular the relative timing at which the intermediate level descriptors are updated relative to the update made to the final level descriptor may be varied.

Figure 6:
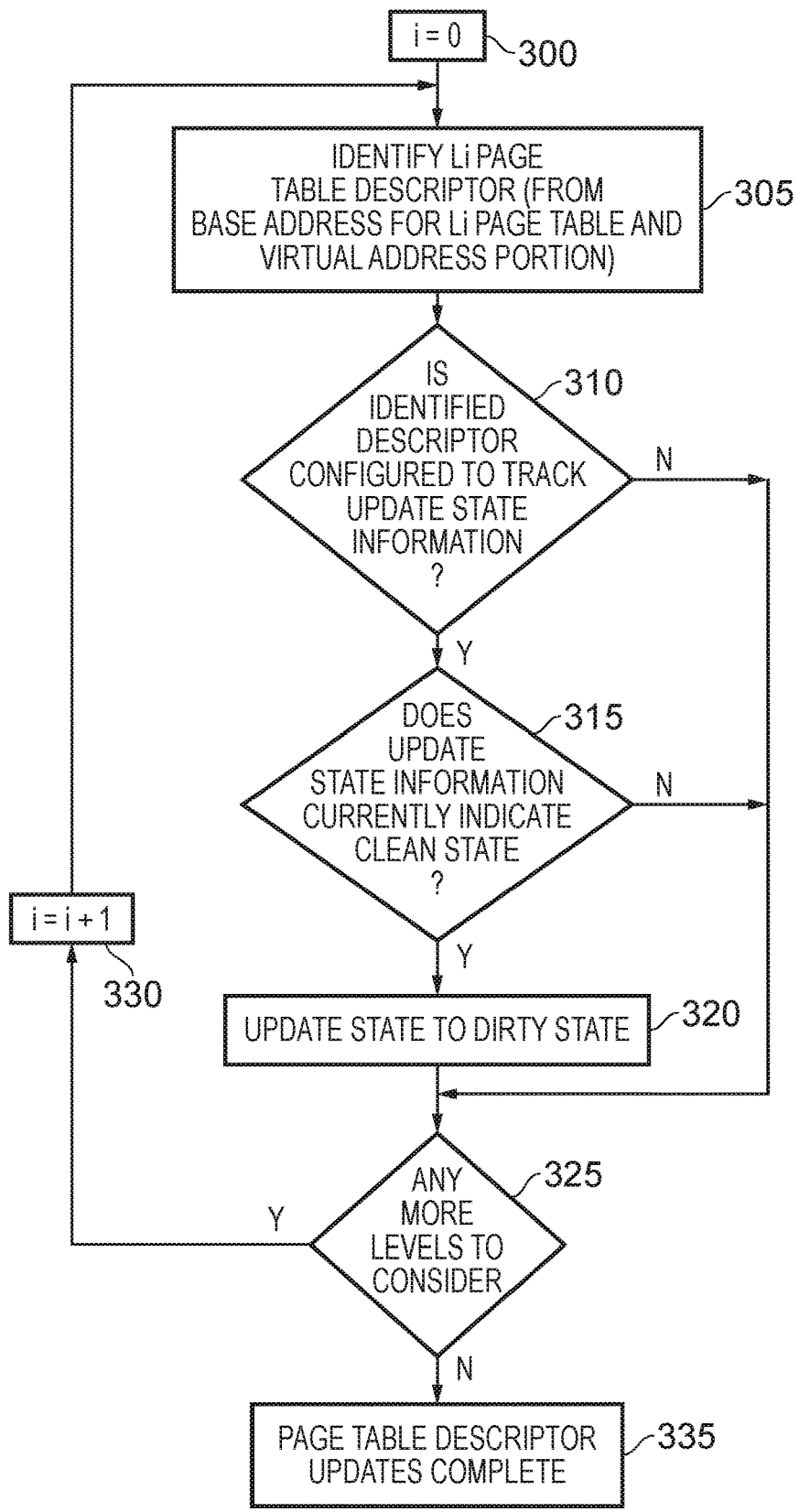
FIG. 6 is a flow diagram illustrating in more detail steps performed in one example implementation to implement the final step of FIG. 5.

FIG. 6 is a flow diagram illustrating a first option for implementing the final step of FIG. 5, which may also be referred to as a top down approach. At step 300, a parameter i is set equal to and then at step 305 the level i page table descriptor is identified. As will be apparent from the earlier discussed FIG. 3, the identification of this page table descriptor is performed using a base address for the level i page table and a portion of the provided virtual address specified by the request received at step 250 of FIG. 5.

Thereafter, at step 310, it is determined whether the identified descriptor is configured to track update state information. In one example implementation, it may typically be the case that such tracking will not be provided at level L0, and instead will only be provided at one or more of the higher levels. Further, it will be appreciated that when the identified descriptor is a final level descriptor, it will be configured to track update state information, but for the various intermediate levels this may be dependent on a predetermined configuration for the page table hierarchy, or may be dependent on control data such as that specified by control information 40 shown in FIG. 1.

If at step 310 it is determined that the identified descriptor is configured to track update state information, then at step 315 it is determined whether the update state information currently indicates the clean state. If it does, then at step 320 the update state information is updated to indicate the dirty state. Conversely, if the update state information does not currently indicate the clean state, and hence for example is already marked as dirty, or is in the untracked state, then no change is made to the state, and step 320 is bypassed. Similarly, if at step 310 the identified descriptor is determined not to be tracking update state information, then steps 315 and 320 are bypassed.

At step 325, it is determined whether there are any more levels to consider, and if so the parameter i is incremented by 1 at step 330 and the process then returns to step 305.

Once all levels have been considered, then at step 335 it is determined that the page table descriptor update process is complete. In one example implementation, once all of the page table descriptors have been updated, then the original request to update the page in memory is allowed to proceed. In some implementations it may be possible to initiate the update of the page in memory at an earlier stage, whilst ensuring that the page table descriptor updates are completed before the page update is considered completed so as to avoid a race condition arising.

Figure 7:
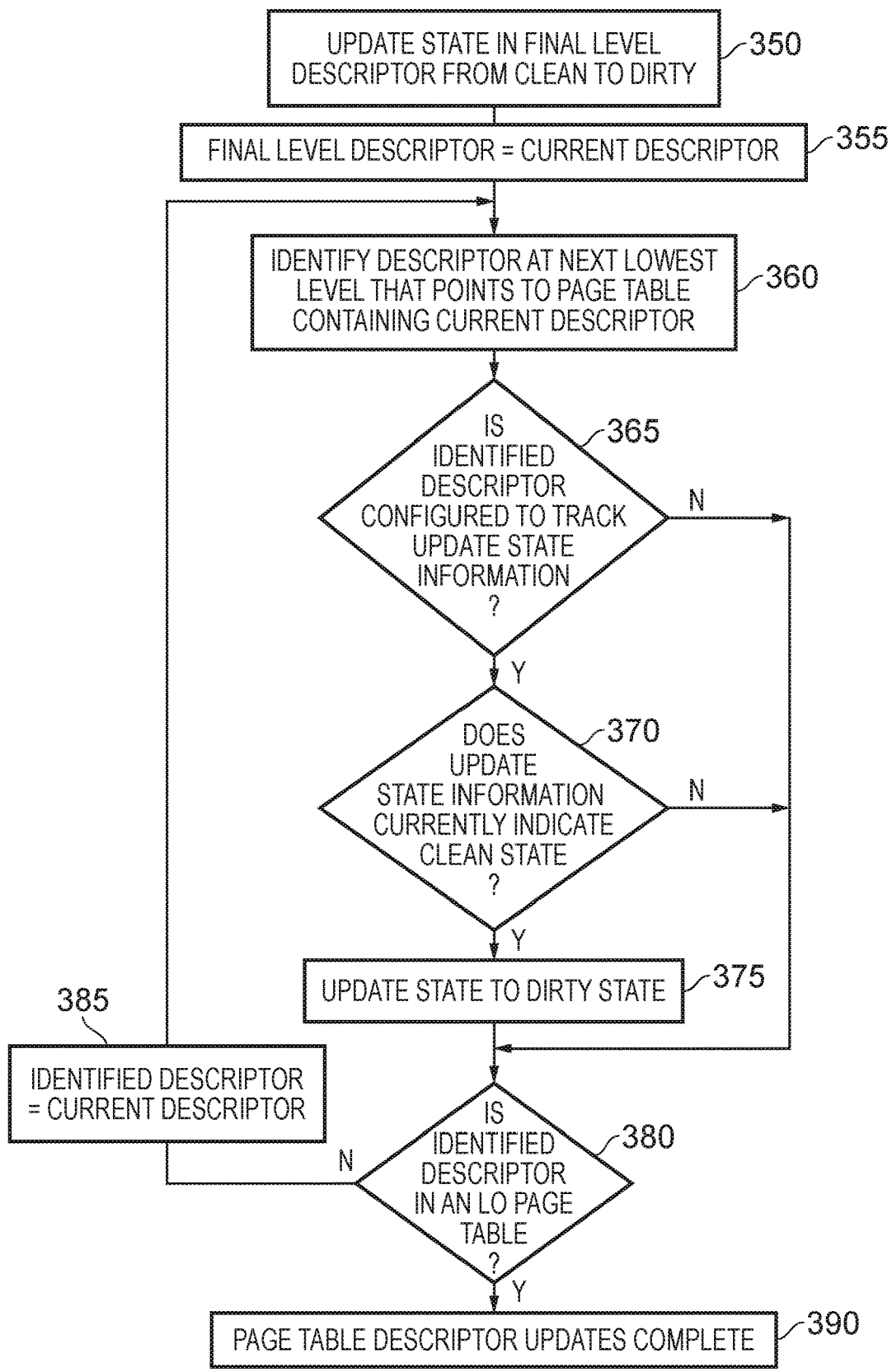
FIG. 7 is a flow diagram illustrating in more detail steps performed in an alternative example implementation to implement the final step of FIG. 5.

FIG. 7 is a flow diagram illustrating an alternative approach that can be used to implement the final step of FIG. 5, this approach also being referred to herein as the bottom up approach. At step 350, the state in the final level descriptor is updated from the clean state to the dirty state.

Following step 350, then at step 355 the final level descriptor is considered to be the current descriptor. At step 360, the page table update circuitry is then arranged to identify the descriptor at the next lowest level that points to the page table containing the current descriptor. Hence, by way of example, if the final level descriptor whose state is changed from the clean to the dirty state at step 350 is the descriptor 162, then step 360 will be used to identify the intermediate level descriptor 147 that points to the page table 160 containing the final level descriptor 162.

At step 365, it is then determined whether the identified descriptor is configured to track the update state information, and if so it is then determined at step 370 whether the update state information within that descriptor currently indicates the clean state. If so, then the state is updated to the dirty state at step 375. As with the earlier discussed FIG. 6, if the update state information is determined at step 370 not to currently indicate the clean state (for example because it is already in the dirty state or the untracked state), then step 375 is bypassed. Similarly if the identified descriptor is determined not to be configured to track update state information, then steps 370 and 375 are bypassed.

At step 380, it is determined whether the identified descriptor is in a level 0 page table, and if not the identified descriptor is then considered to be the current descriptor at step 385, whereafter the process returns to step 360. However, once at step 380 it is determined that the currently identified descriptor is in a level 0 page table, then the process proceeds to step 390 where the page table descriptor update process is considered complete. In an alternative implementation, if configuration information is available to indicate the lowest level that is tracking the dirty/clean state information, this can be referred to at step 380, and the yes path from step 380 can be followed once the identified descriptor is at that lowest level, thereby allowing an earlier exit from the process of FIG. 7 in such implementations.

As with the discussion of FIG. 6, once all of the page table descriptors have been updated, then the original request to update the page in memory is allowed to proceed. In some implementations it may be possible to initiate the update of the page in memory at an earlier stage, whilst ensuring that the page table descriptor updates are completed before the page update is considered completed so as to avoid a race condition arising.

Figure 8:
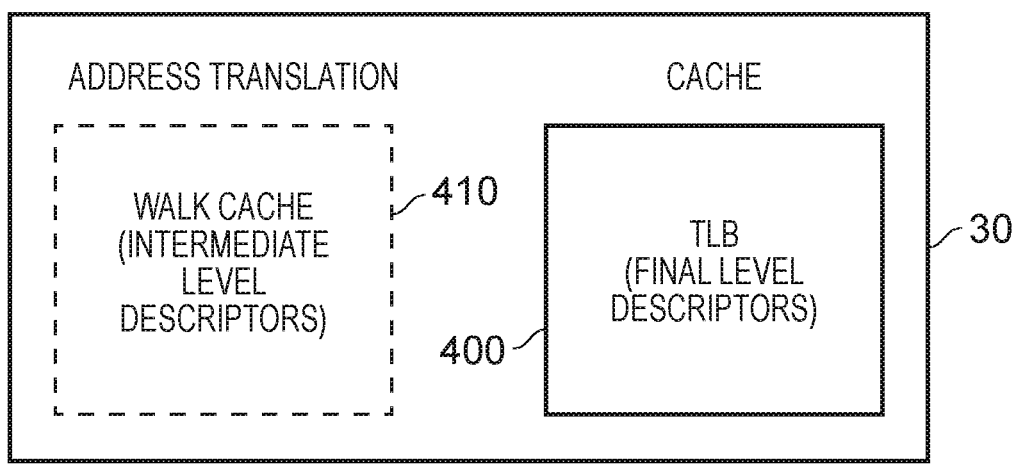
FIG. 8 schematically illustrates different caching structures that may be provided within the address translation cache of FIG. 1 in accordance with one example implementation.

FIG. 8 illustrates the form of the address translation cache 30 of FIG. 1 in one example implementation. As shown in FIG. 8, the address translation cache includes a TLB 400 used to cache final level descriptors obtained from page tables 35 within the memory system 15. However, optionally the address translation cache 30 may also include an intermediate descriptor cache, also referred to herein as a walk cache, 410 that is used to cache intermediate level descriptors retrieved from page tables 35 within the memory system 15. As discussed earlier, the use of the address translation cache 30 can speed up the process of performing virtual to physical address translation in response to requests from the processing circuitry 10. In addition, as will be discussed in more detail with reference to FIGS. 9A and 9B, it could also be used by the page table update circuitry when seeking to determine which descriptors need their state information updating.

Figure 9A:
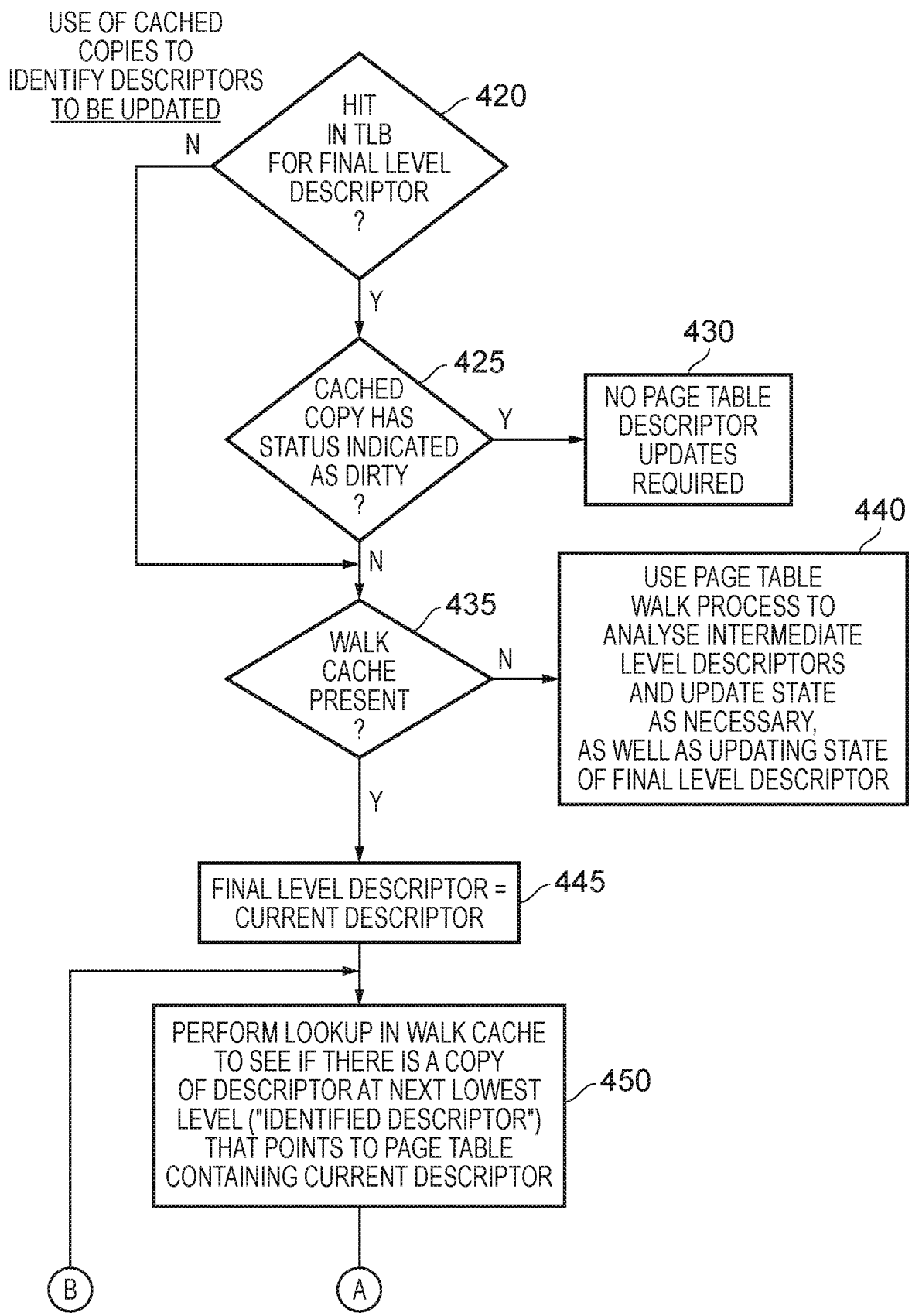
FIGS. 9A and 9B provide a flow diagram illustrating how cached copies of descriptors provided within the address translation cache may be used when determining which descriptors need to be updated, in accordance with one example implementation.

As shown in FIG. 9A, the page table update circuitry 35 can cause a lookup to be performed within the address translation cache, and in particular within the TLB 400, to determine if there is a hit for the identified final level descriptor, i.e. the final level descriptor that points to the memory page seeking to be accessed by the request issued from the processing circuitry. If there is a hit, then at step 425 it is determined whether that cached copy has the status information indicated as dirty. If so, the process proceeds to step 430 where it is determined that no page table descriptor updates are required. In particular, since the final level descriptor is already in the dirty state, it can be assumed that any required updates to the intermediate level descriptors have already been performed.

However, if either the cached copy is determined not to indicate the dirty state at step 425, or there is no hit in the TLB detected at step 420, then the process proceeds to step 435. With particular regard to the "no" path from step 425, it should be noted that if a cached copy of the final level descriptor is detected, but its state indicates the clean state, this is effectively treated as a miss for the purposes of the page table update process, since it needs to be determined which intermediate level descriptors might also need their state information updating to the dirty state, in addition to the update performed in respect of the final level descriptor.

At step 435, it is determined whether a walk cache is present, and if not the process proceeds to step 440 where the earlier described page table walk process is used in order to analyse the intermediate level descriptors and update their state as necessary, as well as updating the state of the final level descriptor. When implementing step 440, either of the approaches discussed earlier with reference to FIG. 6 or FIG. 7 can be used.

However, if a walk cache is determined to be present at step 435, then at step 445 the final level descriptor is treated as the current descriptor. Then, at step 450, a lookup is performed within the walk cache to see if there is a copy of the descriptor at the next lowest level that points to the page table containing the current descriptor. This descriptor at the next lowest level is referred to herein as the identified descriptor.

Figure 9B:
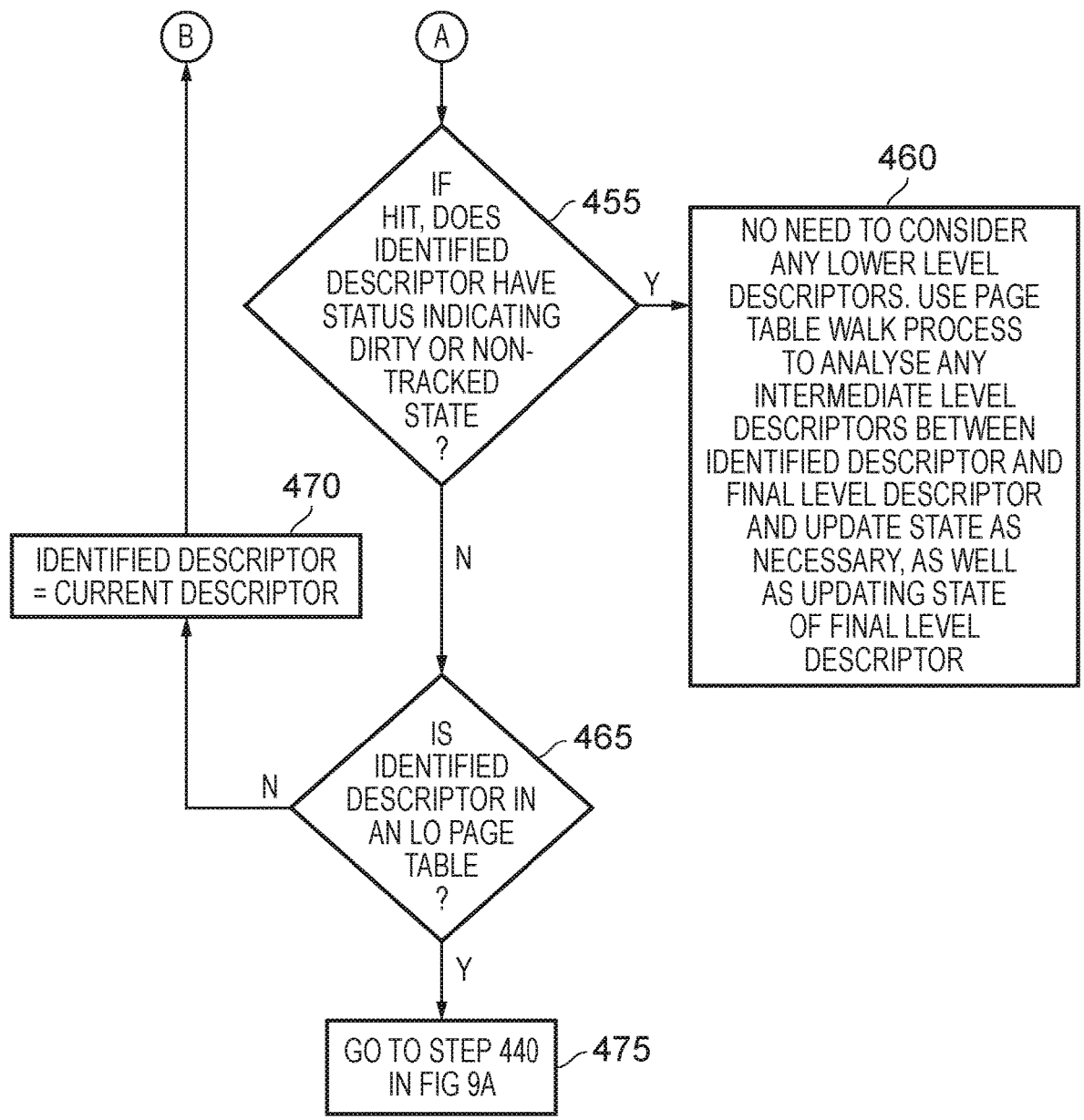

Following step 450, as shown in FIG. 9B, at step 455 it is determined if there was a hit at step 450, and in the presence of a hit whether that identified descriptor has the status indicating the dirty or the non-tracked state. If so, then the process can proceed to step 460, where it is determined that there is no need to consider any lower level descriptors. Instead, the page table walk process can be used to analyse any intermediate level descriptors between the identified descriptor and the final level descriptor and update their state as necessary, as well as updating the state of the final level descriptor. As with step 440, the earlier described process of FIG. 6 or FIG. 7 can be used at this point.

If at step 455 the identified descriptor does not have a state indicating the dirty or non-tracked state, then it is determined at step 465 whether the identified descriptor is in a level 0 page table, and if not the identified descriptor is considered to be the current descriptor at step 470, whereafter the process returns to step 450.

However, if the identified descriptor is in a level 0 page table, the process proceeds to step 475 where the process then proceeds to step 440 in FIG. 9A. In particular, at this point a full page table walk will be required in order to analyse the intermediate level descriptors and update their state as necessary.

From the above description, it can be seen that, through reference to the address translation cache, the page table update circuitry 35 may be able to reduce the amount of analysis required in order to determine which intermediate level descriptors need updating, and hence reduce the number of levels that need to be traversed during a page table walk in order to update the relevant descriptors.

Once the address translation cache contents have been used in this way to seek to identify which intermediate level descriptors need updating in addition to the final level descriptor, then in one example implementation any cached copies of those descriptors whose state information is being updated can be either updated or invalidated to ensure that the address translation circuitry does not inadvertently refer to out of date descriptor information when performing future address translations, and to ensure that the page table update circuitry 35 does not refer to out of date cached information when seeking to determine any subsequent page table descriptor updates required.

Further, in some systems it will be appreciated that such address translation information may be cached by multiple entities within the system, and in such situations any suitable coherency technique can be used to ensure that cached copies of the relevant descriptors that may be stored elsewhere in the system are either updated or invalidated when the page table update circuitry updates the status information of those descriptors.

By maintaining the status information within intermediate level descriptors, this can be used by the processing circuitry in order to influence certain operations that it is performing. One particular example use case is that of graphic rendering operations, where the processing circuitry may be a GPU, and may be arranged to periodically perform a graphics rendering operation in respect of a block of data identified by a memory address range. The memory address range may be relatively large, and in particular may span a significant number of memory pages. Hence, it may be considered impractical to seek to perform page table walk operations to identify each final level descriptor, and reference the status information maintained within the final level descriptors to determine whether any of the data within the memory address range is indicated as having been modified. However, by maintaining such information in intermediate level descriptors in the manner described herein, it becomes economically viable for the graphics processing unit to issue a request to the address translation circuitry 20 in order to seek to determine that information. In particular, the address translation circuitry may be able to identify a relatively small number of intermediate level descriptors that cover the address range of interest, and to check the update state information maintained in those intermediate level descriptors. If the update state information in all the relevant intermediate descriptors indicates the clean state, then it is known that no update has been performed, and in some instances this may allow a rendering operation to be avoided, instead making use of the rendering output from a previous rendering cycle.

Figure 10:
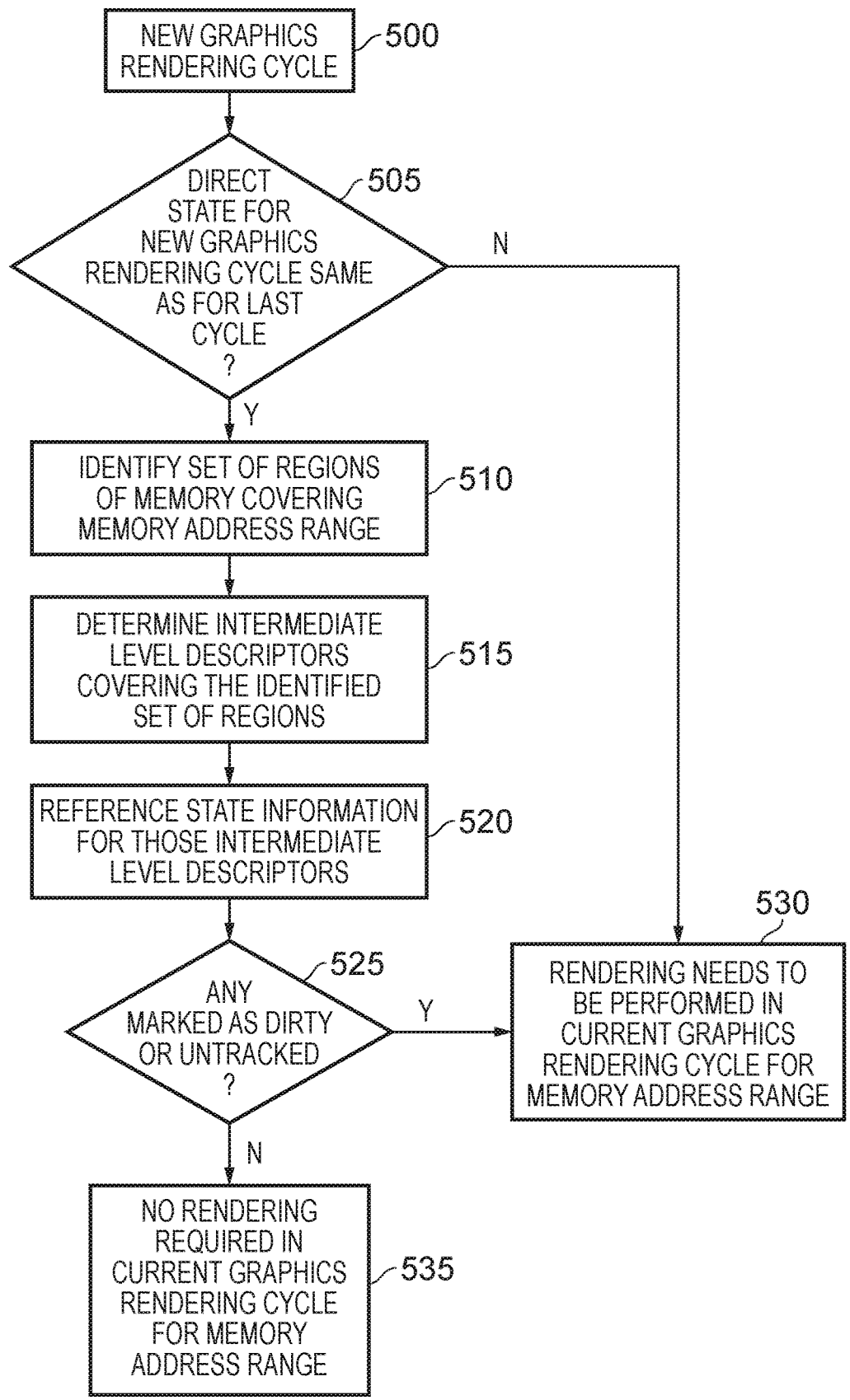
FIG. 10 is a flow diagram illustrating how the techniques described herein can be used to assist in reducing the rendering workload of a graphics processing unit, in accordance with one example implementation.

FIG. 10 is a flow diagram illustrating the processing that may be performed in one example implementation when a new graphics rendering cycle is encountered. At step 500, when a new graphics rendering cycle is encountered, the graphics processing unit determines at step 505 whether the direct state for the new graphics rendering cycle is the same as the direct state used for the last rendering cycle. The direct state is state that is directly available to the GPU, as for example may be provided in one or more registers or command buffers before rendering starts. Examples of such direct state may be information describing how many render targets there are, how many samples per pixel, etc.

If the direct state for the new graphics rendering cycle does not match the direct state for the last cycle, then it does not matter whether the input data to be processed differs or not, and instead the process proceeds to step 530 where it is determined that rendering needs to be performed in the current graphics rendering cycle for the memory address range of interest. Accordingly, the required data will be read in from memory, and then rendering performed on that data using the direct state to control the operations performed.

However, if the direct state for the new graphics rendering cycle is the same as for the last cycle, then the new graphics rendering cycle is a candidate for avoiding rendering if it can be determined that none of the data to be processed has changed since the last rendering cycle.

Accordingly, if the direct state matches at step 505, the GPU can issue a request to the address translation circuitry 20 specifying the memory address range. At step 510, the address translation circuitry 20 can then identify a set of regions of memory covering the memory address range. It should be noted that whilst in one example implementation there may be only one input buffer used in the graphics rendering cycle, in some implementation there could be multiple input buffers. Typically, a contiguous address range will be associated with each input buffer, and hence step 510 could be performed for the memory address ranges associated with each input buffer.

At step 515, the address translation circuitry 20 can then determine the intermediate level descriptors covering the identified set of regions, and in particular can look for the lowest level intermediate level descriptors that maintain state information, and that cover the identified set of regions. Then, at step 520, the intermediate level descriptors can be retrieved, and their state information referenced. At step 525, it can then be determined whether any of those intermediate level descriptors have their state information marked as dirty or untracked. If so, then the process proceeds to step 530 where it is determined that rendering needs to be performed in the current graphics rendering cycle for the relevant memory address range. However, if instead all of the relevant intermediate level descriptors have their state information marked as clean, then at step 535 it is determined that no rendering is required in the current graphics rendering cycle for the memory address range of interest. This can give rise to significant performance benefits, by avoiding the need to perform intensive rendering tasks. This also gives rise to energy consumption benefits. Further, in addition to the avoiding of rendering in such situations, it is also then the case that the data does not need to be read from memory, providing further efficiency savings.

It should be noted that the number of frames processed in each rendering cycle may vary depending on implementation. For example, whilst each rendering cycle may perform rendering in respect of one frame, modern operation systems may allow double or triple buffering of display output, and so a rendering cycle may process two frames in double buffered systems, three frames in triple buffered systems, etc. Further, it is common to use many render passes (a standardised graphics API concept) within each frame.

Figure 11:
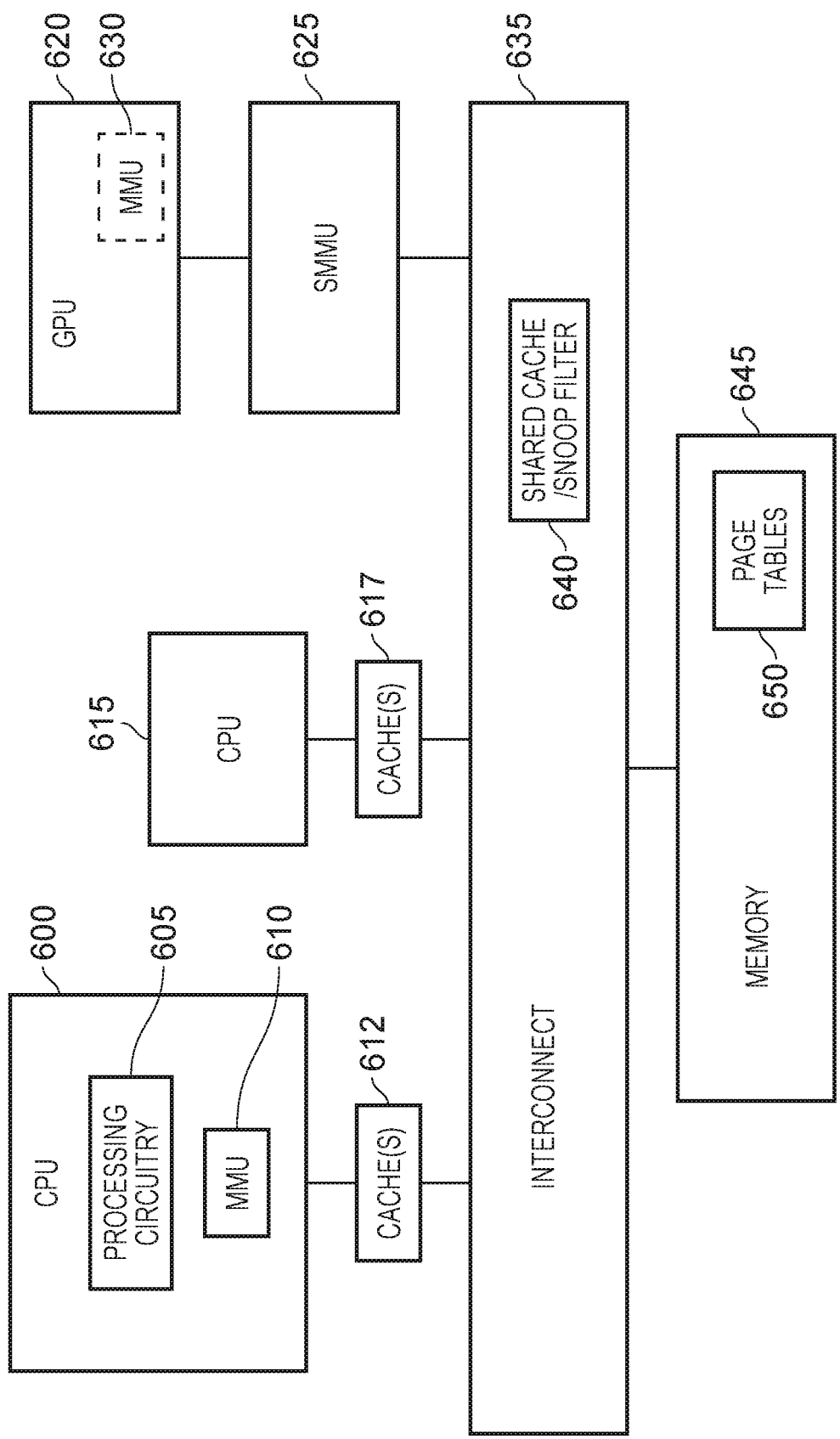
FIG. 11 is a diagram of a data processing system in accordance with one example implementation.

FIG. 11 is a block diagram illustrating one example system, comprising a number of CPUs 600, 615 and a GPU 620. These components may be coupled via an interconnect 635 to memory 645 that may include the page table 650 referred to earlier. The address translation circuitry 20 referred to earlier may take the form of a memory management unit (MMU) provided at one or several locations within the system. For example, considering the CPU 600, this may include processing circuitry 605 with an associated MMU 610 for performing address translation on behalf of the processing circuitry. The CPU 615 may also be arranged in a similar manner, but for simplicity the internal detail of the CPU 615 has been omitted. The GPU 620 on the other hand may make use of a system MMU (SMMU) 625, and again the SMMU may be arranged to incorporate the page table update functionality discussed earlier. In some implementations, the GPU may also include its own internal MMU 630, and that MMU 630 may be used in combination with the SMMU 625 to perform address translation on behalf of the GPU. For example the GPU may use a multi-stage address translation process, each stage including multiple levels, and in this instance the stage one address translation may be performed by the MMU 630, in order to convert a virtual address into an intermediate physical address, and the SMMU 625 may then be used to perform a stage two address translation in order to translate the intermediate physical address into a final physical address within memory 645.

As also shown in FIG. 11, some of the components may have their own local caches, such as the caches 612, 617 associated with the CPUs 600, 615, respectively, and in addition one or more shared caches 640 may also be provided, for example within the interconnect 635. The interconnect may also include snoop circuitry, which in one example implementation may be considered to form part of the shared cache 640, for maintaining coherency between the cache content within the various caches of the system.

As mentioned earlier, when updates are made to the state information maintained within various intermediate and final level descriptors within the page table 650, then any cached contents of those relevant descriptors within the address translation cache components of any of the MMUs may need to be invalidated or updated in order to ensure that out of date descriptor information is not inadvertently referred to. Any suitable coherency mechanism can be used to implement such functionality.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:

address translation circuitry for converting a virtual address specified by processing circuitry into a corresponding physical address of a memory system, with reference to address translation data obtained from a hierarchical arrangement of page tables, the hierarchical arrangement of page tables comprising both intermediate level page tables and final level page tables;

each final level page table comprising a number of final level descriptors, and each final level descriptor identifying the address translation data for an associated region of memory;

each intermediate level page table comprising a number of intermediate level descriptors, and each intermediate level descriptor identifying intermediate address translation data used to identify an associated page table at a next level in the hierarchical arrangement;

page table update circuitry to maintain state information within each final level descriptor, the page table update circuitry being arranged to update the state information of a given final level descriptor from a clean state to a dirty state to indicate that a modification of content of the associated region of memory is permitted;

wherein the page table update circuitry is further arranged to maintain the state information within the intermediate level descriptors provided within at least a subset of the intermediate level page tables, such that for a given intermediate level descriptor in which the state information is maintained, the page table update circuitry is arranged to update the state information of that given intermediate level descriptor from the clean state to the dirty state to indicate occurrence of an update from the clean state to the dirty state within the state information of any final level descriptors that are accessed via that intermediate level descriptor.

2. The apparatus as claimed in claim 1, wherein the hierarchical arrangement of page tables comprises a plurality of levels of page tables, and the at least a subset of the intermediate level page tables within which the page table update circuitry is arranged to maintain the state information comprises the intermediate level page tables at at least one level of the hierarchical arrangement.

3. The apparatus as claimed in claim 2, wherein the at least a subset of the intermediate level page tables comprises the intermediate level page tables within one or more adjacent levels of the hierarchical arrangement.

4. The apparatus as claimed in claim 1, wherein:

the page table update circuitry is arranged to maintain the state information within the intermediate level descriptors such that identification of the dirty state within the state information of the given intermediate level descriptor indicates that a modification of content of the associated page table at the next level in the hierarchical arrangement is permitted;

whereby the page table update circuitry is arranged to update the state information of the given final level descriptor from the clean state to the dirty state to indicate that a modification of content of the associated region of memory is permitted, once each intermediate level descriptor used to identify that given final level descriptor, that has state information maintained therein, identifies the dirty state within that state information.

5. The apparatus as claimed in claim 1, wherein:

the page table update circuitry is arranged, in response to updating the state information of the given final level descriptor from the clean state to the dirty state to indicate that a modification of content of the associated region of memory is permitted, to track back through the levels in the hierarchical arrangement to identify each intermediate level descriptor used to identify that final level descriptor, and for each identified intermediate level descriptor that has state information maintained therein, to update the state information as necessary to indicate the dirty state.

6. The apparatus as claimed in claim 1, further comprising: address translation cache storage to store copies of one or more descriptors retrieved from the hierarchical arrangement of page tables; wherein the page table update circuitry is arranged to reference the address translation cache storage when determining which page table descriptors need updating when seeking to update content within the region of memory associated with the given final level descriptor.

7. The apparatus as claimed in claim 6, wherein when the address translation cache storage stores a copy of the given final level descriptor whose state information indicates the dirty state, the page table update circuitry is arranged to determine that no update is required to the page table descriptors in the hierarchical arrangement of page tables.

8. The apparatus as claimed in claim 6, wherein in the absence of the address translation cache storage storing a copy of the given final level descriptor whose state information indicates the dirty state, the page table update circuitry is arranged to determine that an analysis operation is required in respect of the intermediate level descriptors used to identify the given final level descriptor, in order to determine whether state information maintained for any of those intermediate level descriptors is required to be updated in addition to updating the state information of the given final level descriptor from the clean state to the dirty state.

9. The apparatus as claimed in claim 6, wherein the address translation cache storage comprises a translation lookaside buffer to store copies of one or more final level descriptors.

10. The apparatus as claimed in claim 9, wherein the address translation cache storage further comprises an intermediate descriptor cache to store copies of intermediate level descriptors from page tables at one or more intermediate levels in the hierarchical arrangement of page tables.

11. The apparatus as claimed in claim 10, wherein in the absence of the translation lookaside buffer storing a copy of the given final level descriptor whose state information indicates the dirty state, the page table update circuitry is arranged to perform a lookup operation in the intermediate descriptor cache to seek to track back through the levels in the hierarchical arrangement until either a copy of a non-clean state intermediate level descriptor used to identify the given final level descriptor is detected, or the lookup operation has been performed for all levels in the hierarchical arrangement for which intermediate level descriptors are cached in the intermediate descriptor cache, a non-clean state intermediate level descriptor being an intermediate level descriptor whose state information indicates a non-clean state.

12. The apparatus as claimed in claim 11, wherein the non-clean state is one of a dirty state or a non-tracked state.

13. The apparatus as claimed in claim 11, wherein when during the lookup operation a copy of a non-clean state intermediate level descriptor used to identify the given final level descriptor is detected, the page table update circuitry is then arranged to identify any intermediate level descriptors used to identify the given final level descriptor that exist in levels between the level containing the non-clean state intermediate level descriptor and the final level containing the given final level descriptor, and to then identify the dirty state within the state information maintained by any of those identified intermediate level descriptors.

14. The apparatus as claimed in claim 1, wherein the processing circuitry is arranged to cause the state information maintained within one or more of the intermediate level descriptors to be referenced when determining data processing operations to be performed by the processing circuitry.

15. The apparatus as claimed in claim 14, wherein: the processing circuitry is arranged to periodically perform a graphics rendering operation in respect of a block of data identified by a memory address range; the processing circuitry is arranged, at least when a current rendering cycle meets determined criteria, to issue a request to the address translation circuitry that causes the address translation circuitry to identify a set of regions of memory covered by the memory address range, to determine one or more intermediate level descriptors used to identify the final level descriptors for that set of regions of memory, and to reference the state information stored in those determined one or more intermediate level descriptors in order to determine whether any update to the block of data has occurred since a previous rendering cycle; and in the event it is determined that no update of the block of data has occurred since the previous rendering cycle, the processing circuitry is arranged to use an output of the graphics rendering operation in the previous rendering cycle instead of re-performing the graphics rendering operation.

16. The apparatus as claimed in claim 1, wherein the region of memory is a memory page.

17. The apparatus as claimed in claim 1, wherein the state information within each final level descriptor further comprise an access flag that is set to indicate that the associated region of memory has been accessed, and the state information maintained within the given intermediate level descriptor further includes an access flag which is set whenever any final level descriptors that are accessed via that intermediate level descriptor have set their access flag to indicate access to the associated region of memory.

18. The apparatus as claimed in claim 1, further comprising storage to maintain control information referenced by the page table update circuitry to determine in which levels of the hierarchical arrangement to maintain the status information.

19. A method of tracking modification of content of regions of memory, comprising:
    employing address translation circuitry to converting a virtual address specified by processing circuitry into a corresponding physical address of a memory system, with reference to address translation data obtained from a hierarchical arrangement of page tables, the hierarchical arrangement of page tables comprising both intermediate level page tables and final level page tables;
    arranging each final level page table to comprise a number of final level descriptors, each final level descriptor identifying the address translation data for an associated region of memory;
    arranging each intermediate level page table to comprise a number of intermediate level descriptors, each intermediate level descriptor identifying intermediate address translation data used to identify an associated page table at a next level in the hierarchical arrangement;
    employing page table update circuitry to maintain state information within each final level descriptor, the page table update circuitry being arranged to update the state information of a given final level descriptor from a clean state to a dirty state to indicate that a modification of content of the associated region of memory is permitted;
    arranging the page table update circuitry to additionally maintain the state information within the intermediate level descriptors provided within at least a subset of the intermediate level page tables, such that for a given intermediate level descriptor in which the state information is maintained, the page table update circuitry is arranged to update the state information of that given intermediate level descriptor from the clean state to the dirty state to indicate occurrence of an update from the clean state to the dirty state within the state information of any final level descriptors that are accessed via that intermediate level descriptor.

20. An apparatus comprising:
address translation means for converting a virtual address specified by processing circuitry into a corresponding physical address of a memory system, with reference to address translation data obtained from a hierarchical arrangement of page tables, the hierarchical arrangement of page tables comprising both intermediate level page tables and final level page tables;
each final level page table comprising a number of final level descriptors, and each final level descriptor identifying the address translation data for an associated region of memory;
each intermediate level page table comprising a number of intermediate level descriptors, and each intermediate level descriptor identifying intermediate address translation data used to identify an associated page table at a next level in the hierarchical arrangement;
page table update means for maintaining state information within each final level descriptor, the page table update means for updating the state information of a given final level descriptor from a clean state to a dirty state to indicate that a modification of content of the associated region of memory is permitted;
the page table update means for additionally maintaining the state information within the intermediate level descriptors provided within at least a subset of the intermediate level page tables, such that for a given intermediate level descriptor in which the state information is maintained, the page table update means is arranged to update the state information of that given intermediate level descriptor from the clean state to the dirty state to indicate occurrence of an update from the clean state to the dirty state within the state information of any final level descriptors that are accessed via that intermediate level descriptor.

* * * * *